United States Patent [19]
Basile

[11] 3,909,975
[45] Oct. 7, 1975

[54] METHOD OF SOIL TREATMENT

[76] Inventor: Mario J. Basile, 8512 5th Ave., Brooklyn, N.Y. 11209

[22] Filed: Mar. 26, 1973

[21] Appl. No.: 344,961

[52] U.S. Cl. .................. 43/124; 137/351; 43/131
[51] Int. Cl.² ........................................ A01M 17/00
[58] Field of Search...... 43/124, 131, 132 A, 132 R; 222/478, 482; 138/105, 125; 47/48.5

[56] References Cited
UNITED STATES PATENTS

| | | | |
|---|---|---|---|
| 448,070 | 3/1891 | Perry | 222/490 |
| 2,105,800 | 1/1938 | Watkins | 47/48.5 X |
| 3,109,258 | 11/1963 | Jensen | 47/48.5 |
| 3,209,485 | 10/1965 | Griffin | 43/124 |
| 3,518,831 | 7/1970 | Tibbals, Jr. et al. | 47/48.5 X |
| 3,528,251 | 9/1970 | Falk | 47/48.5 X |
| 3,534,891 | 10/1970 | Bozich | 222/478 |
| 3,602,248 | 8/1971 | Peacock | 137/357 |
| 3,624,953 | 12/1971 | Crosby | 43/124 X |
| 3,757,469 | 9/1973 | Smith et al. | 47/48.5 |

Primary Examiner—Louis G. Mancene
Assistant Examiner—Peter K. Skiff
Attorney, Agent, or Firm—Howard C. Miskin

[57] ABSTRACT

A network of interconnected rigid or collapsible perforated pipes are installed below ground, such as before the erection of a wood containing structure, and an inlet pipe extends from the network to an accessible point. A solution or emulsion of a termicide is pumped under pressure through the inlet pipes and pipe network to impregnate the ground underlying or around the structure, when required, to inhibit termite growth and destroy any termite colonies. As an alternative, in slab on ground construction, the slab is provided at accessible points with suitably spaced openings providing communication with the ground, the openings being closed by removable plugs.

8 Claims, 5 Drawing Figures

U.S. Patent    Oct. 7,1975    3,909,975

METHOD OF SOIL TREATMENT

BACKGROUND OF THE INVENTION

The present invention relates generally to improvements in the control of insects and it relates particularly to an improved method and apparatus for the treatment of structure supporting ground areas with termicidal compositions.

Subterranean termites are highly destructive of wooden structures and are widely distributed and cause considerable damage. Inasmuch as the subterranean termite must have access to the ground soil from the wooden structure, a common expedient is to treat the soil underlying and surrounding the structure with a composition which is poisonous to the termite, However, the termicidal compositions which are available while highly effective over a period of time, eventually are dissipated and lose their effectiveness and the soil and structure may then be reinfested with termites. It is conventional to reimpregnate the soil periodically with a termicidal composition, but this is generally an expensive, inconvenient and time consuming procedure, particularly in ground on slab, basement type and similar structures, since it involves considerable trenching and refilling, and the drilling of large numbers of holes in concrete with the subsequent patching thereof and otherwise leaves much to be desired.

SUMMARY OF THE INVENTION

A principal object of the present invention is to provide an improved method and apparatus for the control of insects.

Another object of the present invention is to provide an improved method and apparatus for the control of subterranean termites. Still another object of the present apparatus is to provide an improved method and apparatus for impregnating soil with termicidal compositions to destroy and inhibit termite infestation.

A further object of the present invention is to provide an improved method and apparatus of the above nature characterized by their reliability, ease and convenience of application and use of their economy, high effectiveness and great versatility and adaptability.

In a sense, the present invention contemplates the provision of a system for treating and maintaining soil underlying a structure in a termite free state by installing in the soil underlying the structure a network of perforated pipes which communicate with an inlet pipe which is readily accessible. A termicide in a liquid state, advantageously an aqueous emulsion or solution of the termicide, is pumped under pressure through the inlet pipe and the perforated pipe network into the soil underlying the structure until the soil is sufficiently impregnated to prevent and destroy any termite infestation. The pipes forming the network may be rigid and formed of any suitable material, such as asphalt, asbestos, metal, or polymeric resin such as a polyolefin, for example, polypropylene, nylon polyvinyl chloride or the like or the pipes may be collapsible, expandable pipes formed of rubber or a synthetic organic thermoplastic resin such as polyvinyl chloride containing a suitable plasticizer, or a resin of similar physical properties. The pipe network is advantageously installed during the preparation of the structure ground foundation and should extend to all the critical areas, particularly where there is contact with the soil, such as at footings and in the areas underlying any ground slabs. Additional pipes can be used to cover areas interrupted by structures or footings. Also runners can be connected to the pipes to vary the depth of treatment, such as in deeper holes placed selectively along the pipe path. The inlet pipe terminates in an accessible coupling, preferably close to floor level and in operation the outlet of a liquid pressure pump is connected to the inlet pipe and the pump inlet is connected to a tank of the liquid termicidal composition from which is delivered a measured quantity of termicide to the soil base. The treatment is repeated at intervals to maintain the soil in a state which is poisonous to termites.

The improved method and apparatus is reliable, economical, easy and convenient to employ for the initial as well as for subsequent treatments.

DESCRIPTION OF THE PREFERRED EMBODIMENTS

Figure 1:
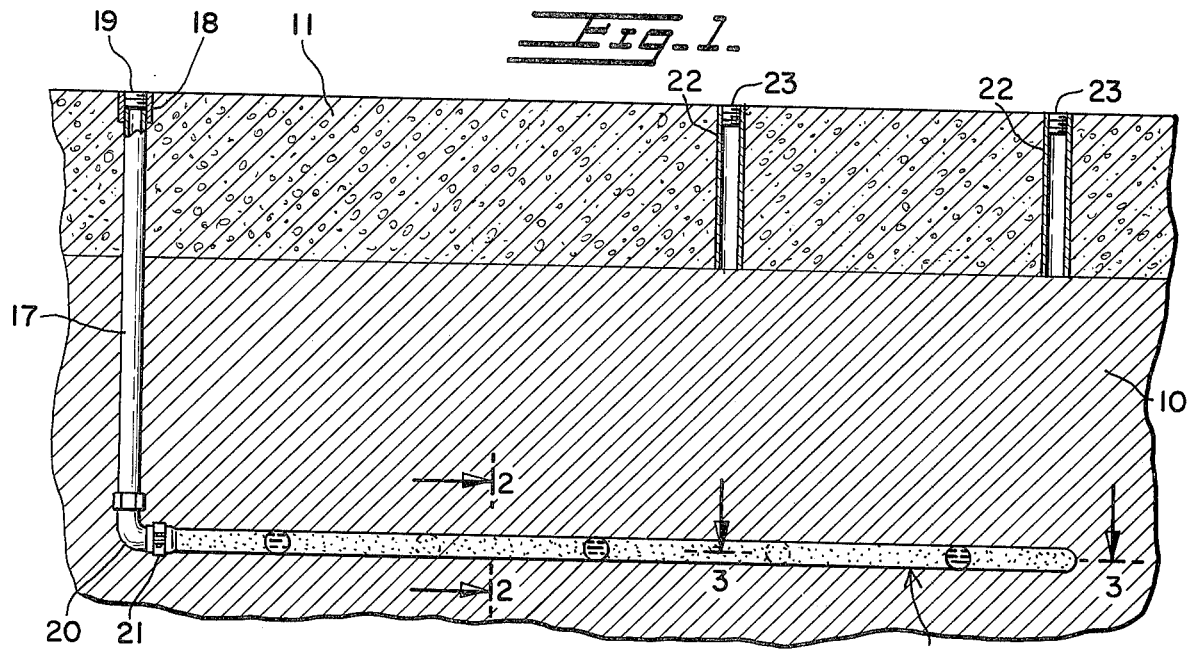
FIG. 1 is a vertical sectional view of a system embodying the present invention as applied to a slab on ground structure and illustrated in a charged operative condition.
Figures 2, 2A, 3:
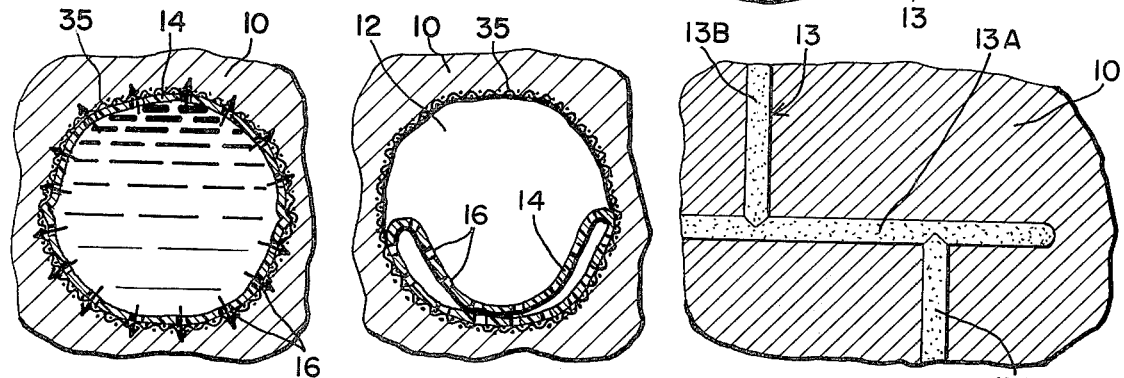
FIG. 2 is a sectional view taken along line 2—2 in FIG. 1.
FIG. 2A is a view similar to FIG. 2 with the termicide in one system being shown as depleted.
FIG. 3 is a sectional view taken along line 3—3 in FIG. 1.
Figure 4:
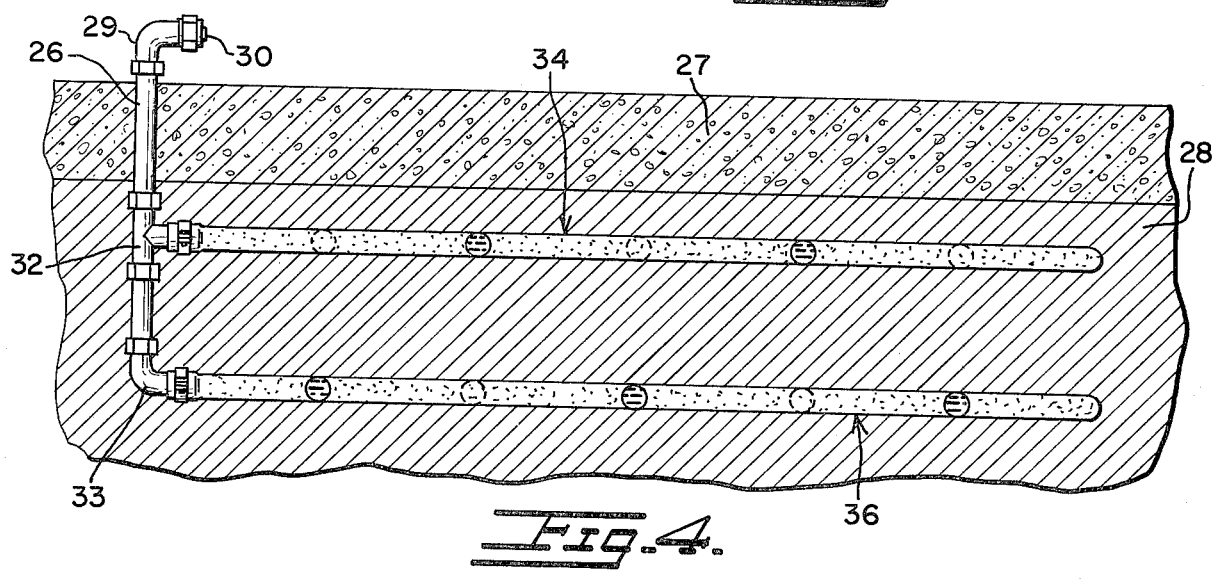
FIG. 4 is a view similar to FIG. 1 of another embodiment of the present invention.

Referring now to the drawings and particularly FIGS. 1 to 3 thereof which illustrate a preferred embodiment of the present invention, the reference numeral 10 generally designates the ground or soil upon which a wood containing structure is erected such as a house or any domestic or commercial building. The ground supported structure may include a basement, a ground slab resting directly on the soil or separated therefrom by sheets of waterproofing material and is exposed to the underlying soil 10. Thus, as illustrated by way of example, the structure is erected on a reinforced concrete slab 11 supported by the soil 10.

A network of tunnels 12 is suitably formed in the soil 10 substantially coextensive with the base area of the ground slab 11 or any other ground contacting foundation, the faces of the tunnels 12 being pervious to permit free liquid communication between the tunnels 12 and the surrounding soil. The tunnels 12 of the network communicate with each other and may include one more longitudinal runs and arms branching transversely or downwardly from the longitudinal runs.

Housed in the network of tunnels 12 is a corresponding network 13 of perforated pipes 14 which are closed at their free ends. As shown, the pipes 14 have flexible walls to permit the expansion and collapse thereof and in their expanded condition are of substantially the diameters of the tunnels 12. The pipes 14 are formed of the flexible materials above set forth, for example, a plasticized polyvinyl chloride, and have openings 16 formed therein for the length and perimeter thereof. The openings 16 may be distributed in accordance with the termicide requirements of related areas and while the tunnel and pipe network are shown at a common horizontal level, they may vary in their elevation, also depending on the soil termicide requirements. The number and possibly size of the openings in the pipe advantageously increases as the distance from the inlet increases, so as to maintain a generally uniform emission along the pipe as the pressure decreases. In the illustrated embodiment, the pipe network 13 includes a longitudinal run 13A from which staggered transverse arms 13B extend, although this configuration may vary.

Extending vertically through the concrete slab 11 and soil 10 to the feed end of the pipe network 13 is a rigid imperforate feed pipe 17 terminating at its top in an internally threaded pipe coupling 18. The pipe coupling 18 is advantageously at the level of the top face of the slab 11 and is closed by a removable screw plug 19, it being understood that any suitably constructed and positioned coupling which may be selectively closed may be employed. The lower end of the feed pipe 13 has an elbow fitting 20 coupled thereto which in turn is coupled to the feed end of pipe network 13 by means of a union connection 21 which engages the threaded end of fitting 20 and a reinforced threaded end of the pipe network 13. The pipe network 13 is installed before the laying of slab 11 in any suitable manner such as, for example, by forming narrow trenches in the soil 10 to correspond to the tunnel network 12, laying the pipe network 13 along the bases of the trenches and connecting the feed pipe 17 to the network. The trenches are then filled and thereafter the slab 11 is cast in place about the feed pipe 17.

Also advantageously positioned in the slab 11 during the casting thereof are a plurality of vertical tubular members 22 which may be formed of metal or any suitable polymeric resin. The tubular members 22 are anchored in and extend between the opposite faces of slab 11 and are internally threaded at their top portion for the reception of removable closure plugs 23 which be likewise formed of metal or plastic Where the slab 11 already exists, suitable spaced vertical bores may be drilled therein and these bores may be closed by removable plugs which advantageously do not project above the slab top face.

Further, the pipe system can extend around a structure, with the trench made close to the foundation and the pipe laid, in the flat condition and the trench filled. The expansion of the pipe compacts the soil of the trench.

In employing the system described above, to impregnate the soil 10 with a termicidal composition, the plug 19 is removed and the outlet of a liquid pump is connected to the coupling 18. The pump inlet is connected to a tank of the liquid termicidal composition and driven to deliver the liquid termicidal composition under pressure throughout the pipe network 13. As a result the pipes 14 expand into tight engagement with the walls of tunnels 12 and by reason of the consequent flexing of the pipes 14, any sediment clogging openings 16 is loosened and forced from the openings under the pressure of the liquid. The liquid termicide diffuses under pressure into the surrounding soil until the soil 10 is suitably impregnated. The liquid termicide pumped into feed pipe 17 may be metered to determine when an adequate amount has been delivered. The pump is then disconnected from coupling 18 which is then closed by plug 19. Thereafter, the liquid insecticide slowly diffuses from pipes 14 into soil 10 to replenish insecticide which is dissipated from the soil. The above procedure may be repeated at suitable intervals.

To augment or partially or wholly replace the dispensing of the liquid insecticide through the pipe network 13, liquid termicide may be injected into the soil 10 at desired or required areas by removing the plugs 23 to open corresponding feed tubes 22 and pumping the liquid termicide therethrough, the tubes 22 being reclosed by the plugs 23, following the injection of the termicide. Any suitable liquid termicidal composition may be employed, for example, aqueous emulsions of suitable concentrations of one or more of the following chemicals: chlordane, dieldrin, benzene, hexachloride, aldrin, heptachlor or the like.

The embodiment of the present invention shown in FIG. 4 differs from that first described primarily in that a pair of termicide distributing networks are provided at different levels, the systems otherwise being similar. Specifically, a vertical feed pipe 26 extends vertically through the concrete slab 27 supported by the ground soil 28 and is provided at its top with a coupling 29 having a removable closure plug 30. The feed pipe 26 is connected to one end of the cross arm of a T fitting 32, the other end of which is connected by a short length of depending pipe to an elbow fitting 33. A first pipe network 34 has its feed end connected to the T fitting 32 and a second pipe network 36 has its feed end connected to the elbow fitting 33. The pipe networks are of a nature similar to pipe network 13 and are housed in correspondingly configured tunnels, the pipes of the networks 34 and 36 being flexible as in the case of network 13 or rigid, with the pipes being perforate. The networks 34 and 36 may be of similar or different configuration to effect the desired termicide distribution. In addition, bores may be formed through slab 27 and provided with removable plugs, like the tubes 22 and plugs 23 in the first described form.

One type of opening found to reduce sediment from entering the pipes is a cross, so that internal pressure separates the slits to allow flow of the composition, but once the pressure is stopped the hole closes again.

Also, rather than one long network, short sections can be used.

While there have been described and illustrated preferred embodiments of the present invention, it is apparent that numerous alterations, omissions and additions may be made without departing from the spirit thereof.

What is claimed is:

1. The method of treating soil adjacent a structure for the destruction and prevention of termite infestation comprising positioning in such soil adjacent such structure a network of pipes, providing openings in said pipes, feeding into said pipe network a liquid termicidal composition, periodically applying a predetermined pressure to said liquid, forming the pipes of a pliable material in normally collapsed condition, expanding said pipes in response to the pressure applied to said liquid and forcing liquid through said openings of the expanded pipe into said surrounding soil to impregnate the soil with said liquid composition, whereby said pipes collapse when no pressure is applied to the fluid and expand when said predetermined pressures is applied to the fluid.

2. The method of claim 1 further including providing tunnels in said soil in which said pipes are placed.

3. The method of claim 1 further including position said pipes at different levels in said soil.

4. The method of claim 1 further including placing said pipes at at least two levels in a trench with each level being generally parallel to each other, and feeding each level simultaneously.

5. The method of claim 4 further including making the openings in said pipe larger and increasing the number of such openings as the distance of the pipes increases from the source of the liquid composition.

6. A pipe system for practicing the method of claim 1 including a network of intercommunicating pipes located in the soil adjacent said structure, said pipe being normally collapsible and adapted to be expandable and having apertures along their length, a feed pipe extending vertically from said network to at least the level of said soil for receiving the input of liquid composition, said feed pipe having an inlet at its outer end and a renewable cover closing said opening substantially at the level of said soil wherein said pipe openings may be covered by said soil, said pipes expanding in response to the pressurized liquid termicidal composition being received in said pipe network wherein said pipes expand during application of said pressurized liquid and collapse when said pressure is removed.

7. The system of claim 6 wherein said apertures are generally crossed slits, so that the liquid is forced through said slits and the slits close when the pressurized liquid is removed and the pipes collapse to prevent ingress of soil.

8. The system of claim 6 wherein the pipes at different levels are each connected to the feed pipe.

* * * * *